(12) United States Patent
Kim

(10) Patent No.: US 11,747,702 B2
(45) Date of Patent: Sep. 5, 2023

(54) MOTHER SUBSTRATE FOR COLOR CONVERSION SUBSTRATE AND METHOD OF TESTING COLOR CONVERSION SUBSTRATE THEREOF

(71) Applicant: Samsung Display Co., Ltd., Yongin-si (KR)

(72) Inventor: Soodong Kim, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/686,905

(22) Filed: Mar. 4, 2022

(65) Prior Publication Data
US 2023/0004060 A1 Jan. 5, 2023

(30) Foreign Application Priority Data
Jun. 30, 2021 (KR) .......................... 10-2021-0085596

(51) Int. Cl.
*G02F 1/1677* (2019.01)
*G02F 1/13* (2006.01)
*G02F 1/1335* (2006.01)

(52) U.S. Cl.
CPC .......... *G02F 1/1677* (2019.01); *G02F 1/1309* (2013.01); *G02F 1/133514* (2013.01)

(58) Field of Classification Search
CPC ...................................................... G02F 1/1677
See application file for complete search history.

(56) References Cited

U.S. PATENT DOCUMENTS

2003/0184613 A1* 10/2003 Nakamura ................. B41J 2/15
347/107

FOREIGN PATENT DOCUMENTS

| JP | 2003107238 A | 4/2003 |
| KR | 1020060025101 A | 3/2006 |
| KR | 1020110071846 A | 6/2011 |
| WO | 2021251560 A1 | 12/2021 |

* cited by examiner

*Primary Examiner* — Edmond C Lau
(74) *Attorney, Agent, or Firm* — CANTOR COLBURN LLP

(57) ABSTRACT

A mother substrate for a color conversion substrate includes: a substrate including a display area and a tag area, where the tag area is disposed around the display area and includes a plurality of sub-tag areas; a first ink layer disposed in some of the sub-tag areas and having a first color; and a second ink layer disposed in some of the sub-tag areas and having a second color different from the first color. A volume of the first ink layer in each of the some of the sub-tag areas is different from each other, or a volume of the second ink layer in each of the some of the sub-tag areas is different from each other.

12 Claims, 14 Drawing Sheets

MOTHER SUBSTRATE FOR COLOR CONVERSION SUBSTRATE AND METHOD OF TESTING COLOR CONVERSION SUBSTRATE THEREOF

This application claims priority to Korean Patent Application No. 10-2021-0085596, filed on Jun. 30, 2021, and all the benefits accruing therefrom under 35 U.S.C. § 119, the content of which in its entirety is herein incorporated by reference.

BACKGROUND

1. Field

Embodiments relate to a color conversion substrate. In more detail, embodiments relate to a mother substrate for the color conversion substrate and a method of testing the color conversion substrate thereof.

2. Description of the Related Art

A display device may implement red, green, blue, or the like according to the wavelength of emitted light. The display device including a color conversion substrate has been proposed to realize excellent color reproducibility and luminance. The color conversion substrate may include a color conversion layer including quantum dots or the like.

In order to increase the light efficiency of the color conversion substrate, it is desirable to accurately determine a cause of the defect of the color conversion layer. Causes of defects include color mixing between inks in an inkjet process, ink overflow, etc. Accordingly, the inkjet process may be reproduced to determine the cause of the defect of the color conversion layer.

SUMMARY

Embodiments provide a mother substrate for a color conversion substrate with improved light efficiency.

Other embodiments provide a method of testing color conversion substrate with improved defect improvement rate.

A mother substrate for a color conversion substrate according to an embodiment includes: a substrate including a display area and a tag area, where the tag area is disposed around the display area and includes a plurality of sub-tag areas; a first ink layer disposed in some of the sub-tag areas and having a first color; and a second ink layer disposed in some of the sub-tag areas and having a second color different from the first color. A volume of the first ink layer in each of the some of the sub-tag areas is different from each other, or a volume of the second ink layer in each of the some of the sub-tag areas is different from each other.

In an embodiment, the sub-tag areas may include a first sub-tag area and a second sub-tag area, a sum of the volume of the first ink layer in the first sub-tag area and the volume of the second ink layer in the first sub-tag area may be equal to a sum of the volume of the first ink layer in the second sub-tag area and the volume of the second ink layer in the second sub-tag area, and a ratio of the volume of the first ink layer in the first sub-tag area and the volume of the second ink layer in the first sub-tag area may be different from a ratio of the volume of the first ink layer in the second sub-tag area and the volume of the second ink layer in the second sub-tag area.

In an embodiment, the sub-tag areas may further include a third sub-tag area in which at least one of the first ink layer and the second ink layer is disposed, the ratio of the volume of the first ink layer in the first sub-tag area and the volume of the second ink layer in the first sub-tag area may be equal to a ratio of a volume of the first ink layer in the third sub-tag area and a volume of the second ink layer in the third sub-tag area, and the sum of the volume of the first ink layer in the first sub-tag area and the volume of the second ink layer in the first sub-tag area may be different from a sum of the volume of the first ink layer in the third sub-tag area and the volume of the second ink layer in the third sub-tag area.

In an embodiment, the sub-tag areas may further include a fourth sub-tag area in which at least one of the first ink layer and the second ink layer is disposed, the ratio of the volume of the first ink layer in the first sub-tag area and the volume of the second ink layer in the first sub-tag area may be different from a ratio of a volume of the first ink layer in the fourth sub-tag area and a volume of the second ink layer in the fourth sub-tag area, and the sum of the volume of the first ink layer in the first sub-tag area and the volume of the second ink layer in the first sub-tag area may be different from a sum of the volume of the first ink layer in the fourth sub-tag area and the volume of the second ink layer in the fourth sub-tag area.

In an embodiment, the mother substrate may further include a partition defining at least one tag opening overlapping with each of the sub-tag areas.

In an embodiment, the display area may include a sub-pixel area, the partition may define a pixel opening overlapping with the sub-pixel area, and a volume of the pixel opening may be equal to a volume of the tag opening.

In an embodiment, the mother substrate may further include a color conversion layer disposed in the sub-pixel area.

In an embodiment, the first ink layer and the second ink layer may be disposed in the tag opening, and a sum of a volume of the first ink layer in the tag opening and a volume of the second ink layer in the tag opening may be equal to or less than a volume of the color conversion layer.

In an embodiment, the tag area may further include a plurality of over-tag areas spaced apart from the sub-tag areas, and the mother substrate may further include a third ink layer disposed in each of the over-tag areas and having the first color and a fourth ink layer disposed in each of the over-tag areas and having the second color.

In an embodiment, the partition may define at least one over-tag opening overlapping with each of the over-tag areas, and a volume of the over-tag opening may be equal to a volume of the tag opening.

In an embodiment, the tag area may define a plurality of grooves disposed around each of the over-tag areas.

In an embodiment, the third ink layer and the fourth ink layer may be disposed in the over-tag opening, and a sum of a volume of the third ink layer in the over-tag opening and a volume of the fourth ink layer in the over-tag opening may be equal to or greater than a volume of the color conversion layer.

A method of testing a color conversion substrate according to an embodiment includes: providing a substrate including a display area and a first tag area, where the display area includes a sub-pixel area, and the first tag area is disposed around the display area and includes a plurality of sub-tag areas; forming a color conversion layer by providing one of a first ink having a first color and a second ink having a second color different from the first color to the sub-pixel area; forming a first ink layer and a second ink layer by providing the first ink and the second ink, respectively, in different volumes from each other to each of the sub-tag areas of the first tag area; comparing a volume of the color conversion layer in each of the sub-pixel areas with a sum of a volume of the first ink layer in each of the sub-tag areas of the first tag area and a volume of the second ink layer in each of the sub-tag areas of the first tag area; and comparing a volume ratio of the first ink and the second ink included in the color conversion layer in each of the sub-pixel areas with a volume ratio of the first ink layer in each of the sub-tag areas of the first tag area and the second ink layer in each of the sub-tag areas of the first tag area.

In an embodiment, forming the first ink layer and the second ink layer to each of the sub-tag areas of the first tag area may include: providing the second ink after providing the first ink to each of the sub-tag areas of the first tag area.

In an embodiment, the substrate may further include a second tag area disposed around the display area, spaced apart from the first tag area, and including a plurality of sub-tag areas, and the method may further include: providing the first ink and the second ink in different volumes from each other to each of the sub-tag areas of the second tag area.

In an embodiment, providing the first ink and the second ink to each of the sub-tag areas of the second tag area may include: providing the first ink after providing the second ink to each of the sub-tag areas of the second tag area.

In an embodiment, comparing the volume of the color conversion layer with the sum of the volume of the first ink layer and the volume of the second ink layer may include comparing a first value of the sub-pixel area with a first value of each of the sub-tag areas of the first tag area, and the first value may be one of a light absorption amount, an external quantum efficiency, a peak wavelength, and a full width half maximum ("FWHM").

In an embodiment, comparing the volume ratio of the first ink and the second ink included in the color conversion layer with the volume ratio of the first ink layer and the second ink layer may include comparing a second value of the sub-pixel area with a second value of each of the sub-tag areas of the first tag area, and the second value may be one of an external quantum efficiency and a peak wavelength.

In an embodiment, the first tag area may further include a plurality of over-tag areas spaced apart from the sub-tag areas, and the method may further include forming a third ink layer and a fourth ink layer by providing the first ink and the second ink, respectively, in different volumes from each other to each of the over-tag areas.

In an embodiment, a sum of a volume of the third ink layer in each of the over-tag areas and a volume of the fourth ink layer in each of the over-tag areas may be greater than a volume of the color conversion layer.

In the mother substrate for the color conversion substrate according to embodiments of the invention, as the mother substrate includes a tag area, it may be possible to determine a cause of a defect occurring in the color conversion layer of the color conversion substrate. Accordingly, the light efficiency of the color conversion substrate may be effectively improved.

In the method of testing the color conversion substrate according to embodiments of the invention, by forming the first ink layer and the second ink layer in the tag area, comparing the color conversion layer in the pixel area with the first ink layer and the second ink layer in the tag area may be possible. Accordingly, the cause of the defect of the color conversion layer may be quickly and accurately identified. Accordingly, the defect improvement rate of the color conversion substrate may be effectively improved.

DETAILED DESCRIPTION

Figure 1:
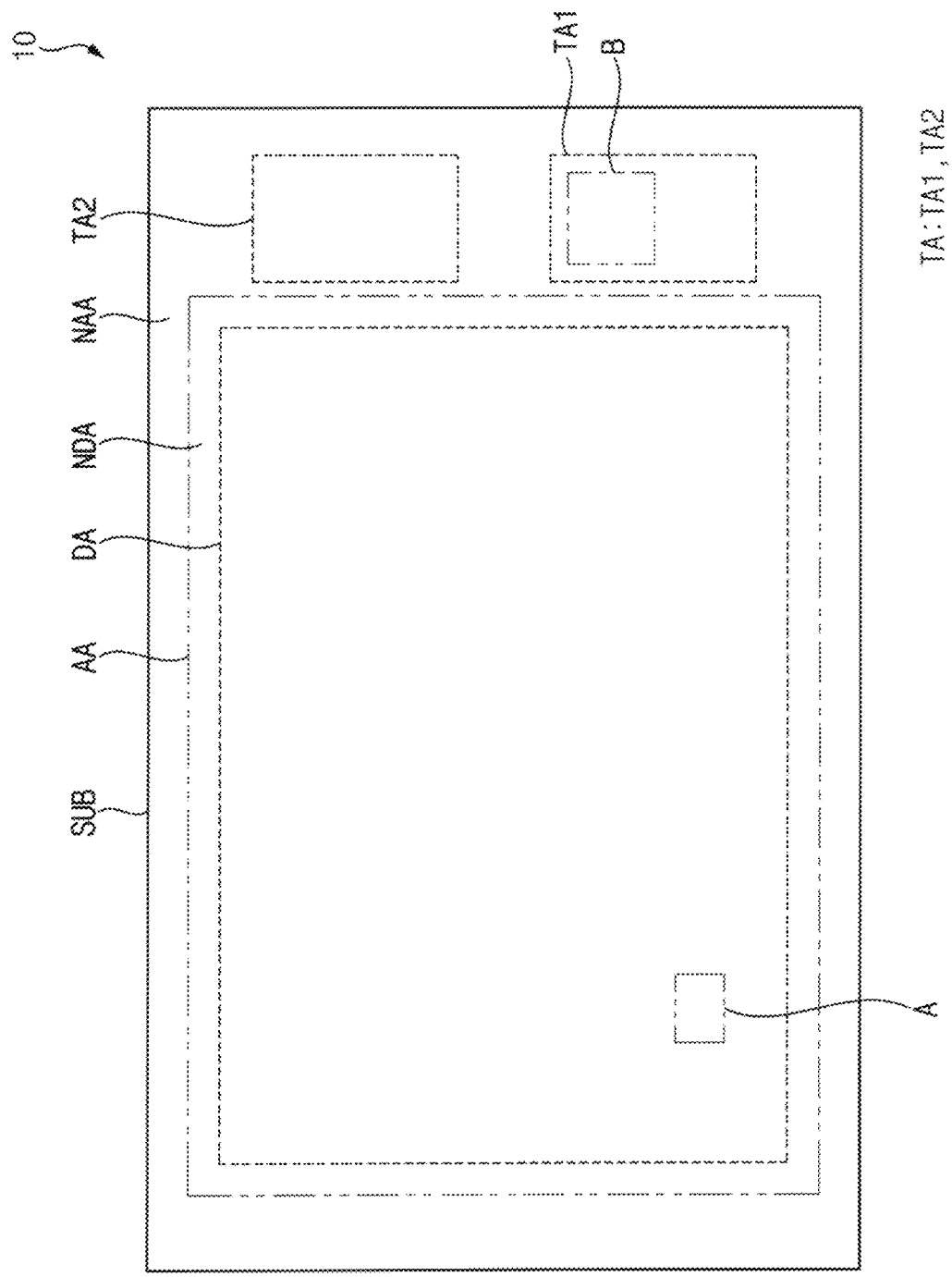
FIG. 1 is a plan view illustrating a mother substrate for a color conversion substrate according to an embodiment of the present invention.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, a mother substrate for a color conversion substrate in accordance with embodiments will be described in more detail with reference to the accompanying drawings. The same reference numerals are used for the same components in the drawings, and redundant descriptions of the same components will be omitted.

Figure 2:
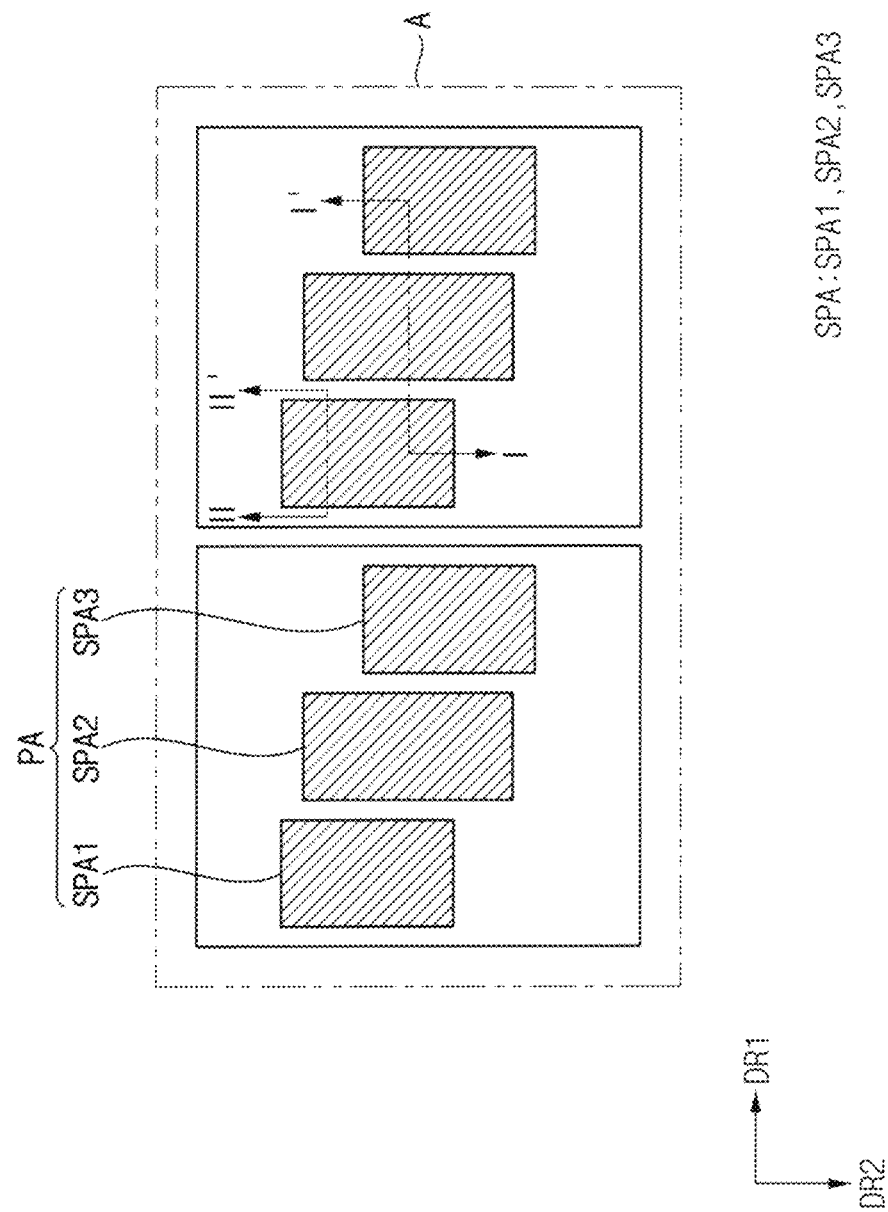
FIG. 2 is a plan view illustrating area A of FIG. 1.
Figure 3:
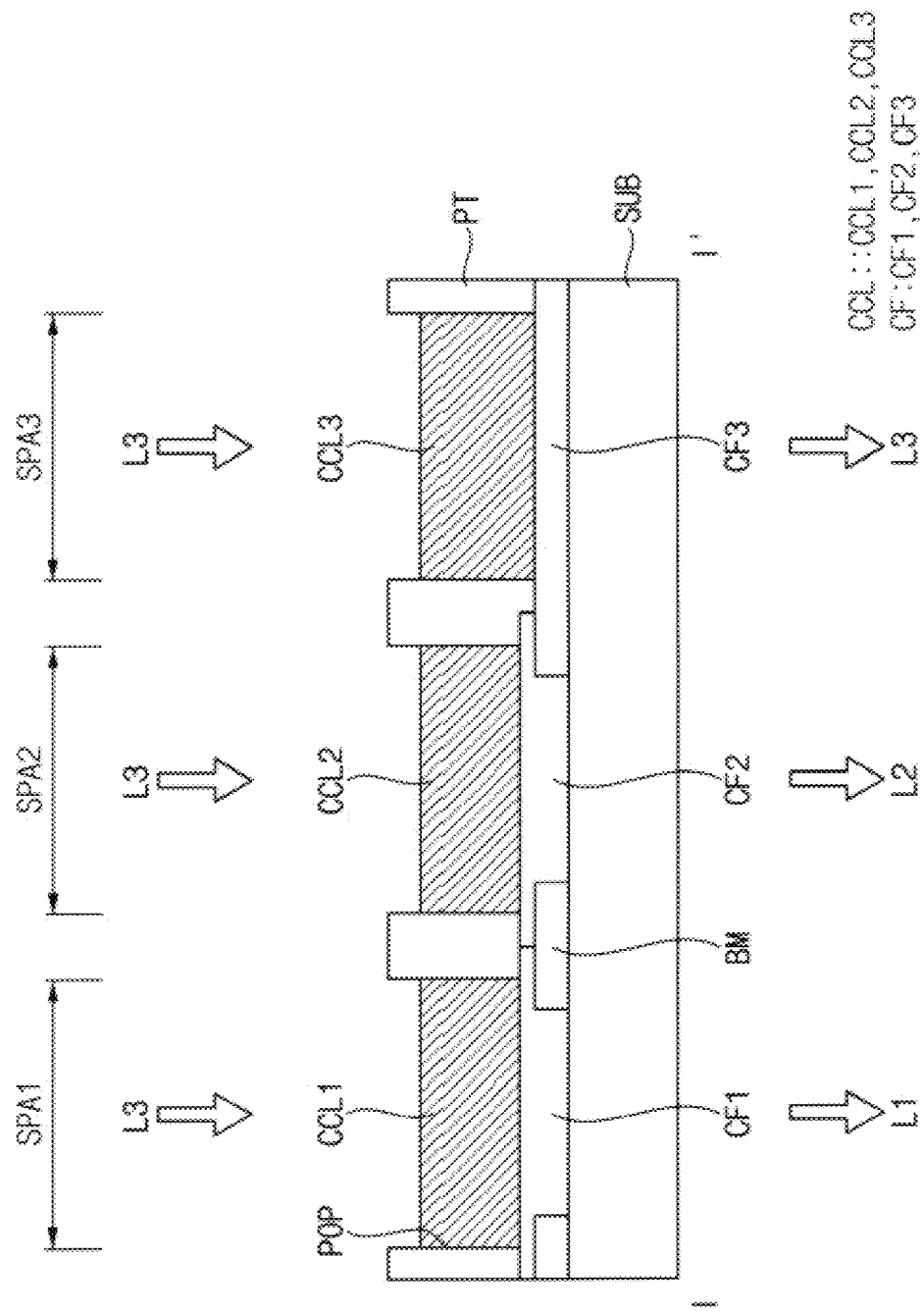
FIG. 3 is a cross-sectional view illustrating a mother substrate for a color conversion substrate taken along line I-I' of FIG. 2.

FIG. 1 is a plan view illustrating a mother substrate for a color conversion substrate according to an embodiment of the present invention. FIG. 2 is a plan view illustrating area A of FIG. 1. FIG. 3 is a cross-sectional view illustrating a mother substrate for a color conversion substrate taken along line I-I' of FIG. 2.

Referring to FIGS. 1, 2, and 3, a mother substrate 10 for a color conversion substrate may include at least one color conversion substrate. For example, the mother substrate 10 for the color conversion substrate may include one color conversion substrate. However, the invention is not limited thereto. A plurality of color conversion substrates may be simultaneously formed in the mother substrate 10 in another embodiment, and the plurality of color conversion substrates may be manufactured by performing a cutting process.

The mother substrate 10 for the color conversion substrate may include a substrate SUB, a partition PT, a black matrix BM, a color filter layer CF, and a color conversion layer CCL.

The substrate SUB may include an effective area AA and an ineffective area NAA. The effective area AA may be an area defined as a color conversion substrate among the mother substrate 10 for color conversion substrate. The ineffective area NAA may be an area to be cut and removed.

The effective area AA may include a display area DA and a non-display area NDA.

The display area DA may be an area for displaying an image. The non-display area NDA may be an area which does not display an image.

The ineffective area NAA may be adjacent to the effective area AA. For example, the ineffective area NAA may surround the effective area AA.

The display area DA may include pixel areas PA. The pixel areas PA may be arranged in a substantially matrix form along a first direction DR1 and a second direction DR2 crossing the first direction DR1. The first direction DR1 may be any one of a row direction and a column direction, and the second direction DR2 may be the other one of the row direction and the column direction.

Each of the pixel areas PA may include a first sub-pixel area SPA1, a second sub-pixel area SPA2, and a third sub-pixel area SPA3. The first sub-pixel area SPA1, the second sub-pixel area SPA2, and the third sub-pixel area SPA3 may emit light of different colors, respectively. The first sub-pixel area SPA1 may emit a first light L1 having a first color, the second sub-pixel area SPA2 may emit a second light L2 having a second color, and the third sub-pixel area SPA3 may emit a third light L3 having a third color. In an embodiment, the first color may be red, the second color may be green, and the third color may be blue. The pixel area PA may emit light of various colors in which the first light L1 emitted from the first sub-pixel area SPA1, the second light L2 emitted from the second sub-pixel area SPA2, and the third light L3 emitted from the third sub-pixel area SPA3 are combined.

The black matrix BM may be disposed on the substrate SUB. The black matrix BM may block or reflect light incident thereon. The black matrix BM may prevent color mixing between the first light L1 emitted from the first sub-pixel area SPA1, the second light L2 emitted from the second sub-pixel area SPA2, and the third light L3 emitted from the third sub-pixel area SPA3.

The color filter layer CF may be disposed on the black matrix BM. The color filter layer CF may cover the black matrix BM on the substrate SUB. The color filter layer CF may include a first color filter CF1, a second color filter CF2, and a third color filter CF3.

The first color filter CF1 may transmit the first light L1 having the first color and block other light except the first light L1. Accordingly, the first color filter CF1 may improve a color purity of the first light L1 emitted from the first sub-pixel area SPA1'.

The second color filter CF2 may transmit the second light L2 having the second color and block other light except the second light L2. Accordingly, the second color filter CF2 may improve a color purity of the second light L2 emitted from the second sub-pixel area SPA2.

The third color filter CF3 may transmit the third light L3 having the third color and block other light except the third light L3. Accordingly, the third color filter CF3 may improve a color purity of the third light L3 emitted from the third sub-pixel area SPA3. In an embodiment, a material of the third color filter CF3 may be substantially equal to a material of the black matrix BM. In this case, the third color filter CF3 and the black matrix BM may be formed substantially simultaneously.

The partition PT may be disposed on the color filter layer CF. The partition PT may block or reflect light incident thereon. The partition PT may prevent color mixing between the first light L1 emitted from the first sub-pixel area SPA1, the second light L2 emitted from the second sub-pixel area SPA2, and the third light L3 emitted from the third sub-pixel area SPA3.

Pixel openings POP overlapping the pixel area PA may be defined in the partition PT. In detail, the partition PT may define the pixel opening POP overlapping each of the sub-pixel areas SPA. A first sub-pixel area SPA1, a second sub-pixel area SPA2, and a third sub-pixel area SPA3 may be defined by the pixel opening POP.

The color conversion layer CCL may convert or transmit light incident thereon. The color conversion layer CCL may fill the pixel opening POP and may be disposed in each of the sub-pixel areas SPA. A volume of the color conversion layer CCL may be substantially equal to or smaller than a volume of the pixel opening POP. Specifically, ink may be disposed on the color conversion layer CCL.

The color conversion layer CCL may include a first color conversion layer CCL1, a second color conversion layer CCL2, and a third color conversion layer CCL3. The first color conversion layer CCL1 may fill the pixel opening POP defining the first sub-pixel area SPA1, and the second color conversion layer CCL2 may fill the pixel opening POP defining the second sub-pixel area SPA2, and the third color conversion layer CCL3 may fill the pixel opening POP defining the third sub-pixel area SPA3. In other words, the first color conversion layer CCL1 may be disposed on the first color filter CF1, the second color conversion layer CCL2 may be disposed on the second color filter CF2, and the third color conversion layer CCL3 may be disposed on the third color filter CF3.

The first color conversion layer CCL1 may convert the third light L3 incident thereto into the first light L1. In an embodiment, a first ink may be disposed on the first color conversion layer CCL1. The first ink may include a first quantum dot and a first scatterer. The first quantum dot may be a particulate material which emits a specific color while electrons transit from a conduction band to a valence band. The first quantum dot may convert the third light L3 into the first light L1. The first scatterer may scatter light incident to the first color conversion layer CCL1 in an arbitrary direction regardless of the incident direction. For example, the first scatterer may include metal oxide particles, organic particles, etc.

The second color conversion layer CCL2 may convert the third light L3 incident thereto into the second light L2. In an embodiment, a second ink may be disposed on the second color conversion layer CCL2. The second ink may include a second quantum dot and a second scatterer. The second quantum dot may be a particulate material which emits a specific color while electrons transit from the conduction band to the valence band. The second quantum dot may convert the third light L3 into the second light L2. The second scatterer may scatter light incident to the second color conversion layer CCL2 in an arbitrary direction regardless of the incident direction. For example, the second scatterer may be the same material as the first scatterer.

The third color conversion layer CCL3 may transmit the third light L3 incident thereto. In an embodiment, a third ink may be disposed on the third color conversion layer CCL3. The third ink may include a third scatterer. The third scatterer may scatter light incident to the third color conversion layer CCL3 in an arbitrary direction regardless of the incident direction. For example, the third scatterer may be the same material as the first scatterer and the second scatterer.

Figure 4:
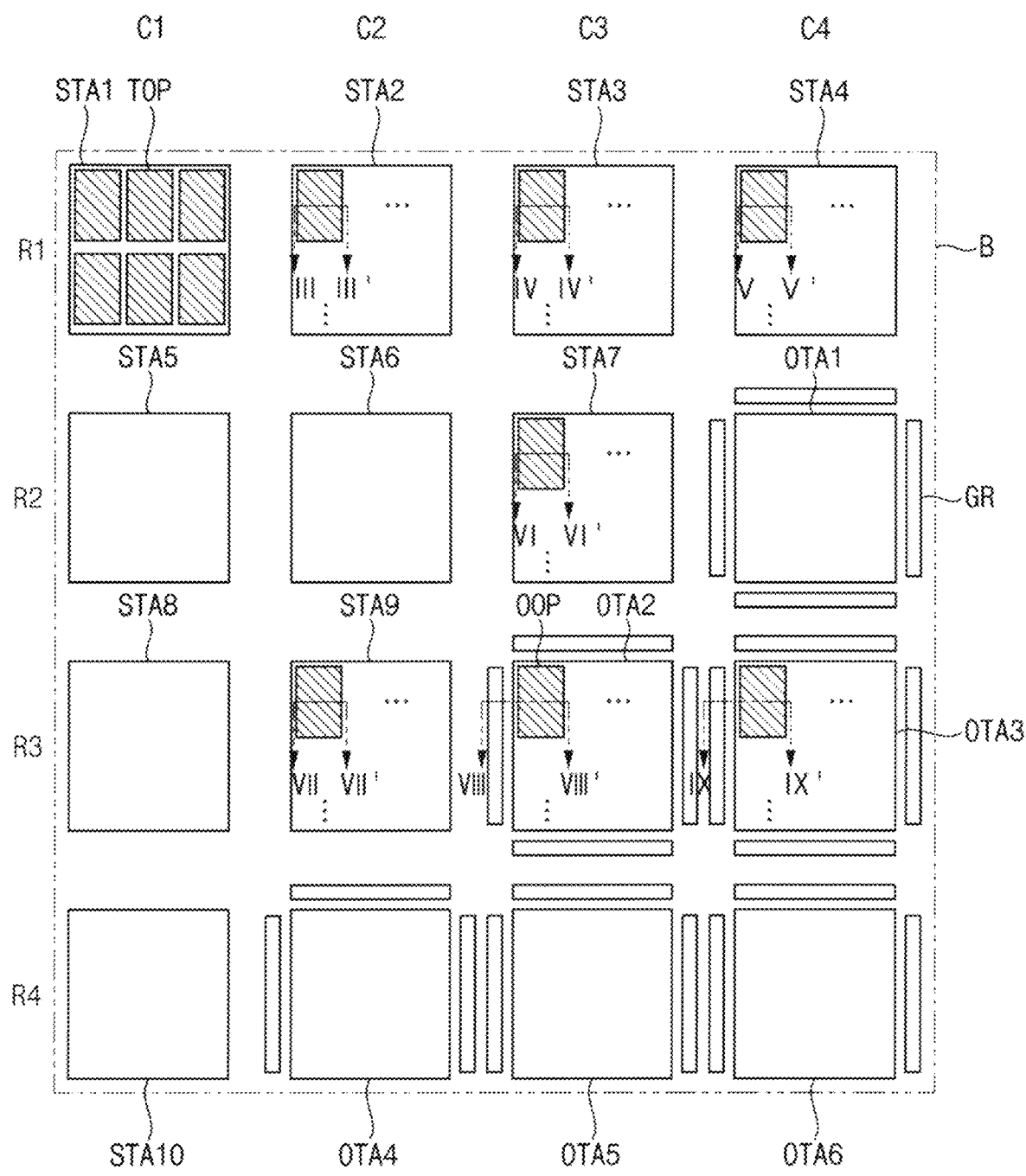
FIG. 4 is a plan view illustrating an example of area B of FIG. 1.
Figure 5:
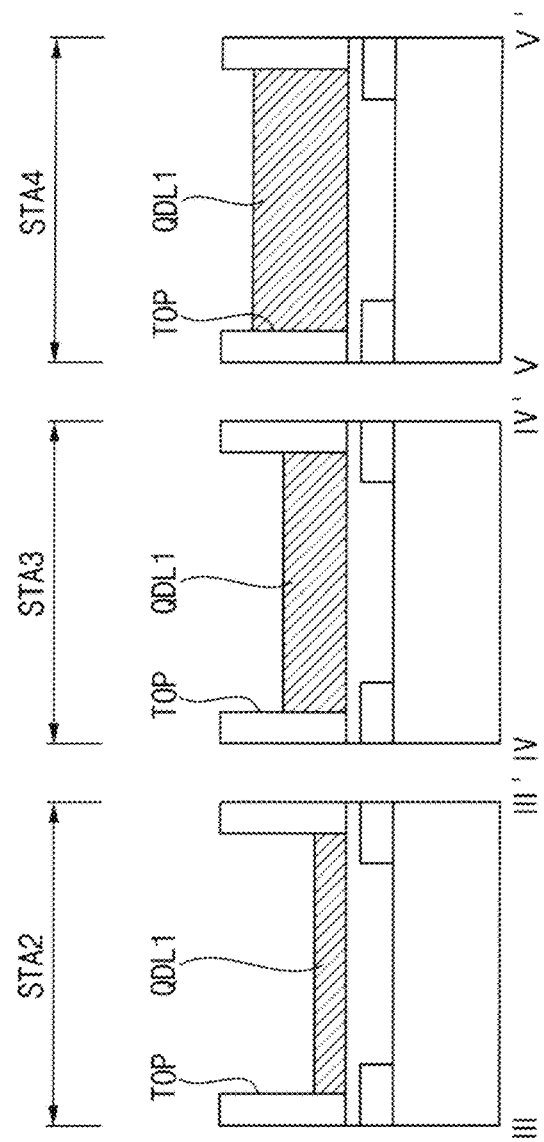
FIG. 5 is a cross-sectional view illustrating a mother substrate for a color conversion substrate taken along lines II-II', III-III', IV-IV', and V-V' of FIG. 4.
Figure 5:
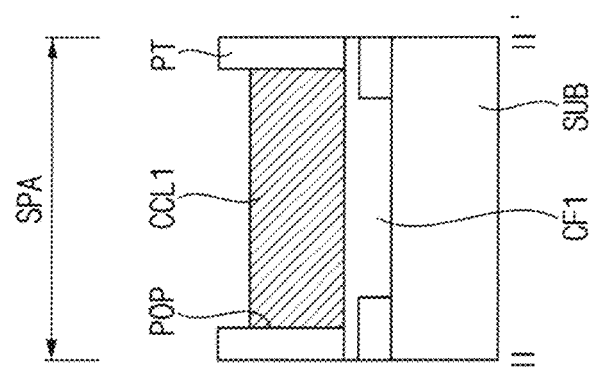
Figure 6:
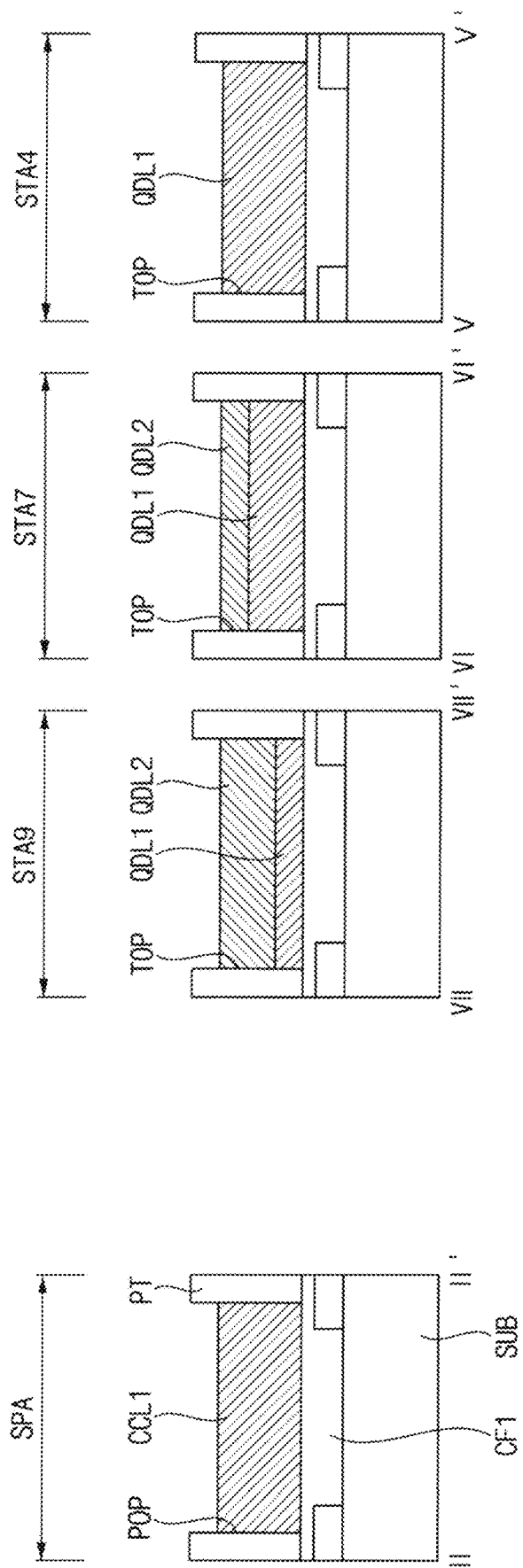
FIG. 6 is a cross-sectional view illustrating a mother substrate for a color conversion substrate taken along lines II-II', VII-VII', VI-VI' and V-V' of FIG. 4.
Figure 7:
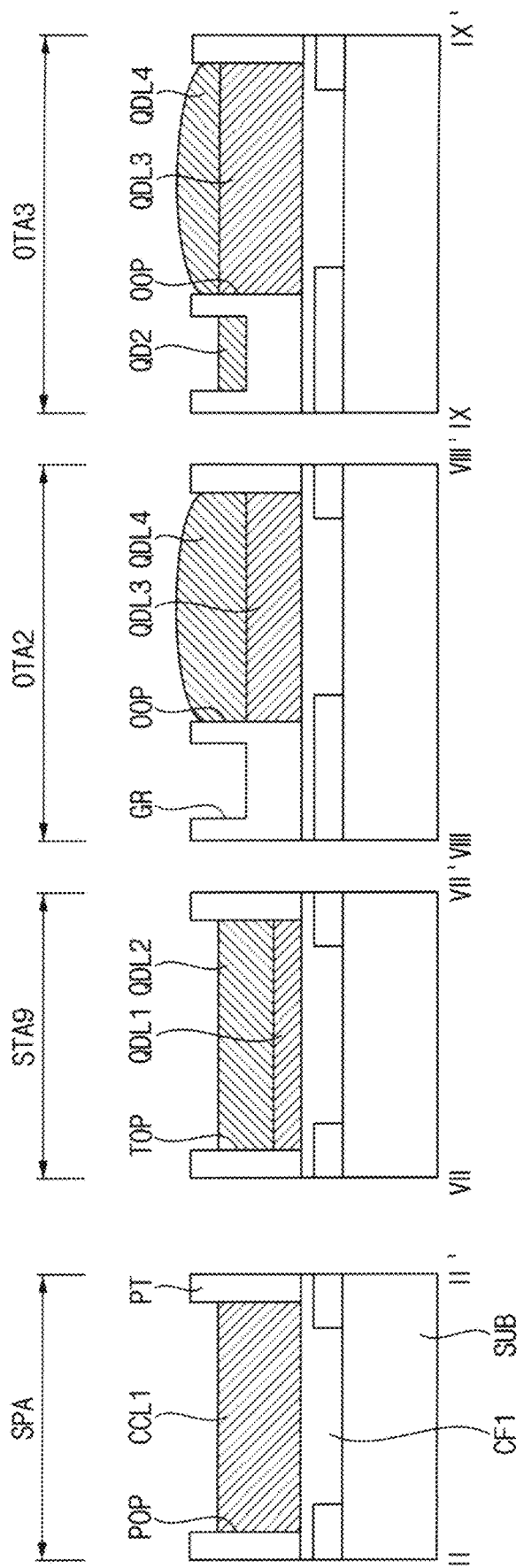
FIG. 7 is a cross-sectional view illustrating a mother substrate for a color conversion substrate taken along lines II-II', VII-VII', VIII-VIII' and IX-IX' of FIG. 4.

FIG. 4 is a plan view illustrating an example of area B of FIG. 1. FIG. 5 is a cross-sectional view illustrating a mother substrate for a color conversion substrate taken along lines II-II', III-III', IV-IV', and V-V' of FIG. 4. FIG. 6 is a cross-sectional view illustrating a mother substrate for a color conversion substrate taken along lines II-II', VII-VII', VI-VI' and V-V' of FIG. 4. FIG. 7 is a cross-sectional view illustrating a mother substrate for a color conversion substrate taken along lines II-II', VII-VII', VIII-VIII' and IX-IX' of FIG. 4. For example, FIGS. 5 to 7 are plan vies illustrating examples of the sub-tag areas STA included in the mother substrate 10 for the color conversion substrate.

Referring to FIGS. 4 to 7, the mother substrate 10 for the color conversion substrate may further include an ink layer QDL. The ink layer QDL may include a first ink layer QDL1, a second ink layer QDL2, a third ink layer QDL3, and a fourth ink layer QDL4. Ink may be disposed on each of the first ink layer QDL1, the second ink layer QDL2, the third ink layer QDL3, and the fourth ink layer QDL4.

The ineffective area NAA may include at least one tag area TA. The tag area TA is adjacent to the display area DA and may be disposed around the display area DA.

In an embodiment, the tag area TA may include a plurality of sub-tag areas STA. For example, the tag area TA may include a first sub-tag area to a tenth sub-tag area STA1, STA2, STA3, STA4, STA5, STA6, STA7, STA8, STA9, STA10. The first to tenth sub-tag areas STA1, STA2, STA3, STA4, STA5, STA6, STA7, STA8, STA9, STA10 may be substantially arranged in a matrix form along the first direction DR1 and the second direction DR2.

In detail, the second to fourth sub-tag areas STA2, STA3, and STA4 may be sequentially disposed along the first direction DR1 from the first sub-tag area STA1. The fifth sub-tag area STA5 may be disposed in the second direction DR2 from the first sub-tag area STA1, and the sixth and seventh sub-tag areas STA6 and STA7 may be disposed sequentially along the first direction DR1 from the fifth sub-tag area STA5. The eighth sub-tag area STA8 may be disposed in the second direction DR2 from the fifth sub-tag area STA5, and the ninth sub-tag area STA9 may be disposed in the first direction DR1 from the eighth sub-tag area STA8. The tenth sub-tag area STA10 may be disposed in the second direction DR2 from the eighth sub-tag area STA8. However, this is an exemplary arrangement and number, and embodiments according to the invention are not limited thereto.

In an embodiment, the tag area TA may include a plurality of over-tag areas OTA. The over-tag areas OTA may be adjacent to the sub-tag areas STA. For example, the over-tag areas OTA may include first to sixth over-tag areas OTA1, OTA2, OTA3, OTA4, OTA5, and OTA6.

For example, the first over-tag area OTA1 may be disposed in the first direction DR1 from the seventh sub-tag area STA7. The second and third over-tag areas OTA2 and OTA3 may be sequentially disposed along the first direction DR1 from the ninth sub-tag area STA9. The fourth to sixth over-tag areas OTA4, OTA5, and OTA6 may be sequentially disposed along the first direction DR1 from the tenth sub-tag area STA10.

However, embodiments according to the invention are not limited to the number of the sub-tag areas STA and the over-tag areas OTA illustrated in the drawings.

In an embodiment, in the tag area TA, the color filter layer CF may be disposed on the substrate SUB. However, embodiments according to the invention are not limited thereto, and in other embodiments, the color filter layer CF may not be disposed on the substrate SUB in the tag area TA.

In an embodiment, the partition PT may be disposed on the color filter layer CF. At least one tag opening TOP overlapping each of the sub-tag areas STA in a plan view may be defined in the partition PT. For example, a plurality of tag openings TOP overlapping the tag area TA may be defined. Also, at least one over-tag opening OOP overlapping each of the over-tag areas OTA in a plan view may be defined in the partition PT in the tag area TA. For example, a plurality of over-tag openings TOP overlapping the tag area TA may be defined.

In an embodiment, a volume of the pixel opening POP may be substantially equal to each of a volume of the tag opening TOP and a volume of the over-tag opening OOP, respectively.

Also, each of a shape of each of the tag opening TOP and the over-tag opening OOP may be substantially equal to a shape of the pixel opening POP. For example, the shape of each of the pixel opening POP, the tag opening TOP, and the over-tag opening OOP may be a rectangle. However, embodiments according to the invention are not limited thereto, and in other embodiments, the shape of each of the tag opening TOP and the over-tag opening OOP may be different from the shape of the pixel opening POP.

A shape of the pixel area PA and a shape of the sub-tag area STA may be different according to the number of pixel openings POP included in the pixel area PA and the number of tag openings TOP included in the sub-tag area STA. For example, when the number of tag openings TOP included in the sub-tag area STA is greater than the number of pixel openings POP included in the pixel area PA, an area of the sub-tag area STA may be larger than an area of the pixel area PA.

The sub-tag area STA and the pixel area PA may have various shapes, respectively. For example, the shape of the sub-tag area STA and the shape of the pixel area PA may be rectangular, respectively.

Similarly, the over-tag area OTA may have various shapes. Also, according to the number of pixel openings POP included in the pixel area PA and the number of over-tag openings OOP included in the over-tag area OTA, the shape of the pixel area PA and the shape of the over-tag area OTA may be different from each other.

In an embodiment, optionally the first ink layer QDL1 and optionally the second ink layer QDL2 may be disposed in each of the tag openings TOP overlapping each of the sub-tag areas STA. That is, the first ink layer QDL1 and/or the second ink layer QDL2 may fill each of the tag openings TOP overlapping each of the sub-tag areas STA.

In an embodiment, a third ink layer QDL3 and a fourth ink layer QDL4 may be disposed in each of the over-tag openings OOP overlapping each of the over-tag areas OTA. That is, the third ink layer QDL3 and/or the fourth ink layer QDL4 may fill the over-tag openings OOP overlapping each of the over-tag areas OTA.

For example, the first ink QD1 may be disposed on each of the first ink layer QDL1 and the third ink layer QDL3. A second ink QD2 may be disposed on each of the second ink layer QDL2 and the fourth ink layer QDL4. That is, each of the first ink layer QDL1 and the third ink layer QDL3 may be defined as a portion on which the first ink QD1 is disposed, and each of the second ink layer QDL2 and the fourth ink layer QDL4 may be defined as a portion on which the second ink QD2 is disposed. (See FIGS. 9 to 11)

The tag openings TOP overlapping one sub-tag area STA may have substantially the same volume of the first ink layer QDL1 and may have substantially the same volume of the second ink layer QDL2 therein. Also, the over-tag openings OOP overlapping one over-tag areas OTA may have substantially the same volume of the third ink layer QDL3 and may have substantially the same volume of the fourth ink layer QDL4 therein.

The first ink QD1 and the second ink QD2 disposed in each of the first to fourth ink layers QDL1, QDL2, QDL3, and QDL4 may be substantially equal to the ink disposed in the color conversion layer CCL overlapping the sub-pixel areas SPA. The first ink QD1 may include the first quantum dots and the first scatterer. The second ink QD2 may include the second quantum dots and the second scatterer. For example, the first ink QD1 may have a red color, and the second ink QD2 may have a green color.

However, the first ink QD1 and the second ink QD2 are not limited thereto, and in another embodiment, the first ink QD1 may be green or white, and the second ink QD2 may be red or white.

Although the drawing illustrates that six tag openings TOP are disposed in one sub-tag area STA, embodiments according to the present invention are not limited thereto, and in other embodiments, one hundred tag openings TOP may be arranged in an arrangement of 10 by 10 in one sub-tag area STA.

However, in the following description, a case in which one tag opening TOP is disposed in one sub-tag area STA will be described.

A sum of the volume of the first ink layer QDL1 in the tag opening TOP and the volume of the second ink layer QDL2 in the tag opening TOP overlapping each of the sub-tag areas STA may be less than or equal to the volume of the tag opening TOP.

In an embodiment, since the volume of the pixel opening POP is substantially equal to the volume of the tag opening TOP and the volume of the over-tag opening OOP, respectively, a sum of the volume of the first ink layer QDL1 and the volume of the second ink layer QDL2 disposed in the tag opening TOP may be less than or equal to the volume of the color conversion layer CCL disposed in the pixel opening POP.

In an embodiment, at least one of the volume of the first ink layer QDL1 and the volume of the second ink layer QDL2 of each of the sub-tag areas STA may be different from each other. That is, the volume of the first ink layer QDL1 of each of the sub-tag areas STA may be different from each other, or the volume of the second ink layer QDL2 of each of the sub-tag areas STA may be different from each other. For example, when the volume of the first ink layer QDL1 of each of the different sub-tag areas STA is the same, the volume of the second ink layer QDL2 of each of the different sub-tag areas STA may be different from each other. When the volume of the second ink layers QDL2 of each of the different sub-tag areas STA are the same, the volume of the first ink layer QDL1 of each of the different sub-tag areas STA may be different from each other. Also, the volume of the first ink layer QDL1 and the volume of the second ink layer QDL2 of each of the different sub-tag areas STA may be different.

For convenience of description, a row in which the first to fourth sub-tag areas STA1, STA2, STA3, STA4 are disposed may be referred to as a first row R1, a row in which the fifth to seventh sub-tag areas STA5, STA6, STAT and the first over-tag area OTA1 are disposed may be referred to as a second row R2, and a row in which the eighth and ninth sub-tag areas STA8, STA9 and the second and third over-tag areas OTA2, OTA3 are disposed may be referred to as a third row R3, and a row in which the tenth sub-tag area STA10 and the fourth to sixth over-tag areas OTA4, OTA5, OTA6 are disposed may be referred to as a fourth row R4.

Similarly, a column in which the first, fifth, eighth, and tenth sub-tag areas STA1, STA5, STA8 and STA10 are arranged may be referred to as a first column C1, and a column in which the second, sixth and ninth sub-tag areas STA2, STA6, STA9 and the fourth over-tag area OTA4 are arranged may be referred to as a second column C2, and a column in which the third and seventh sub-tag areas STA3, STAT and the second and the fifth over-tag areas OTA2 and OTA5 are arranged may be referred to as a third column C3, and a column in which the fourth sub-tag area STA4 and the first, third, and sixth over-tag areas OTA1, OTA3, OTA6 are arranged may be referred to as a fourth column C4.

In addition, the volume of the first ink layer QDL1 and the volume of the second ink layer QDL2 of each of the sub-tag areas STA may mean the volume of the first ink layer QDL1 and the volume of the second ink layer QDL2 disposed in the tag opening TOP overlapping each of the sub-tag areas STA, respectively.

In an embodiment, the first ink layer QDL1 may not be disposed in the first column C1. The first ink layer QDL1 may be disposed in the second column C2 by about ⅓ of the volume of the color conversion layer CCL. That is, the volume of the first ink layer QDL1 in the second column C2 may be about ⅓ of the volume of the color conversion layer CCL. The volume of the first ink layer QDL1 in the third column C3 may be about ⅔ of the volume of the color conversion layer CCL. The volume of the first ink layer QDL1 in the fourth column C4 may be substantially equal to the volume of the color conversion layer CCL.

In an embodiment, the second ink layer QDL2 may not be disposed in the first row R1. In the second row R2, the second ink layer QDL2 may be disposed by about ⅓ of the volume of the color conversion layer CCL. That is, the volume of the second ink layer QDL2 in the second row R2 may be about ⅓ of the volume of the color conversion layer CCL. The volume of the second ink layer QDL2 in the third row R3 may be about ⅔ of the volume of the color conversion layer CCL. The volume of the second ink layer QDL2 in the fourth row R4 may be substantially the same as the volume of the color conversion layer CCL.

However, embodiments according to the invention are not limited thereto, and in another embodiment, the volume of each of the first ink layer QDL1 and the second ink layer QDL2 is about 1/n (provided that n is a positive number of 1 or more) of the volume of the color conversion layer CCL.

For example, referring to FIG. 5, the second ink layer QDL2 may not be disposed in the second sub-tag area STA2, the third sub-tag area STA3, and the fourth sub-tag area STA4. That is, the volume of the second ink layer QDL2 of each of the second sub-tag area STA2, the third sub-tag area STA3, and the fourth sub-tag area STA4 may be 0. The volume of the first ink layer QDL1 of the second sub-tag area STA2 may be about ⅓ of the volume of the color conversion layer CCL. The volume of the first ink layer QDL1 of the third sub-tag area STA3 may be about ⅔ of the volume of the color conversion layer CCL. The volume of the first ink layer QDL1 of the fourth sub-tag area STA4 may be substantially equal to the volume of the color conversion layer CCL. Since the volume of the color conversion layer CCL and the volume of the pixel opening POP are substantially the same, the volume of the first ink layer QDL1 of the fourth sub-tag area STA4 may be substantially equal to the volume of the first color conversion layer CCL1 disposed in the pixel opening POP overlapping the first sub-pixel area SPA1.

A ratio of the volume of the first ink layer QDL1 and the volume of the second ink layer QDL2 of each of the second to fourth sub-tag areas STA2, STA3, STA4 may be equal to one another in 1:0. That is, there is no second ink layer QDL2 in each of the second to fourth sub-tag areas STA2, STA3, STA4. However, the sum of the volume of the first ink layer QDL1 and the volume of the second ink layer QDL2 of each of the second to fourth sub-tag areas STA2, STA3, STA4 may be different from each other.

Although not illustrated in the drawings, a ratio of the volume of the first ink layer QDL1 and the volume of the second ink layer QDL2 of each of the fifth, eighth, and tenth sub-tag areas STA5, STA8, STA10 may be equal to one another in 0:1. That is, there is no first ink layer QDL1 in each of the fifth, eighth, and tenth sub-tag areas STA5, STA8, STA10. However, the sum of the volume of the first ink layer QDL1 and the volume of the second ink layer QDL2 of each of the fifth, eighth, and tenth sub-tag areas STA5, STA8, STA10 may be different from each other. For example, referring to FIGS. 5 and 6, the volume of the first ink layer QDL1 of the seventh sub-tag area STA7 may be equal to the volume of the first ink layer QDL1 of the third sub-tag area STA3, and the volume of the first ink layer QDL1 of the ninth sub-tag area STA9 may be equal to the volume of the first ink layer QDL1 of the second sub-tag area STA2. The volume of the second ink layer QDL2 of the seventh sub-tag area STA7 may be about ⅓ of the volume of the color conversion layer CCL. The volume of the second ink layer QDL2 of the ninth sub-tag area STA9 may be about ⅔ of the volume of the color conversion layer CCL.

A sum of the volume of the first ink layer QDL1 and the volume of the second ink layer QDL2 of each of the fourth, seventh, and ninth sub-tag areas STA4, STA7, STA9 may be equal to each other. That is, the sum of the volume of the first ink layer QDL1 and the volume of the second ink layer QDL2 of each of the fourth, seventh, and ninth sub-tag areas STA4, STA7, and STA9 may be substantially equal to the volume of the color conversion layer CCL. However, a ratio of the volume of the first ink layer QDL1 to the volume of the second ink layer QDL2 of each of the fourth, seventh, and ninth sub-tag areas STA4, STA7, STA9 may be different from each other.

Although not illustrated in the drawings, for example, in the fifth sub-tag area STA5, the first ink layer QDL1 may not be disposed. That is, the volume of the first ink layer QDL1 of the fifth sub-tag area STA5 may be 0, and the volume of the second ink layer QDL2 of the fifth sub-tag area STA5 may be about ⅓ of the volume of the color conversion layer CCL.

Accordingly, a sum of the volume of the first ink layer QDL1 and the volume of the second ink layer QDL2 of each of the third, fifth, and ninth sub-tag areas STA3, STA5, and STA9 may be different from each other. Also, a ratio of the volume of the first ink layer QDL1 and the volume of the second ink layer QDL2 of each of the third, fifth, and ninth sub-tag areas STA3, STA5, STA9 may be different from each other.

In an embodiment, at least one of a volume of the third ink layer QDL3 and a volume of the fourth ink layer QDL4 of each of the over-tag areas OTA may be different from each other. That is, the volume of the third ink layer QDL3 of each of the sub-tag areas STA may be different from each other, or the volume of the fourth ink layer QDL4 of each of the sub-tag areas STA may be different from each other. Also, a sum of the volume of the third ink layer QDL3 and the volume of the fourth ink layer QDL4 of each of the over-tag areas OTA may be greater than the volume of the color conversion layer CCL.

Grooves GR may be further disposed around each of the over-tag areas OTA. The grooves GR may be adjacent to sides of each of the over-tag areas OTA. In other embodiment, the grooves GR may surround the over-tag areas OTA, respectively. The grooves GR may accommodate the first ink QD1 and/or the second ink QD2 overflowing from the over-tag areas OTA. As the grooves GR are disposed around each of the over-tag areas OTA, the first ink QD1 and the second ink QD2 may not flow into other sub-tag areas STA.

Referring to FIG. 7, the second ink layer QDL2 or the fourth ink layer QDL4 may be disposed in substantially the same volume in the ninth sub-tag area STA9, the second over-tag area OTA2, and the third over-tag area OTA3. That is, the volume of the second ink layer QDL2 of the ninth sub-tag area STA9, and the volume of the fourth ink layer QDL4 of each of the second over-tag area OTA2 and the third over-tag area OTA3 may be about ⅔ of a volume of the tag opening TOP. The volume of the first ink layer QDL1 of the ninth sub-tag area STA9 may be about ⅓ of the volume of the tag opening TOP. A volume of the third ink layer QDL3 of the second over-tag area OTA2 may be about ⅔ of the volume of the over-tag opening OOP. The volume of the third ink layer QDL3 of the third over-tag area OTA3 may be substantially equal to the volume of the color conversion layer CCL.

That is, a sum of the volume of the third ink layer QDL3 and the volume of the fourth ink layer QDL4 of each of the second and third over-tag areas OTA may be equal to or greater than the volume of the over-tag opening OOP. Since the volume of the over-tag opening OOP and the volume of the pixel opening POP are substantially equal, the sum of the volume of the third ink layer QDL3 and the volume of the fourth ink layer QDL4 of each of the over-tag areas OTA may be greater than or equal to the volume of the color conversion layer CCL.

In an embodiment, even when the sum of the volume of the third ink layer QDL3 and the volume of the fourth ink layer QDL4 of the second over-tag area OTA2 is greater than the volume of the over-tag opening OOP, the second ink QD2 may not overflow. Accordingly, the second ink QD2 may not be disposed in the groove GR adjacent to the second over-tag area OTA2.

In an embodiment, since the sum of the volume of the third ink layer QDL3 and the volume of the fourth ink layer QDL4 of the third over-tag area OTA3 is greater than the volume of the over-tag opening OOP, the second ink QD2 may overflow. Accordingly, the second ink QD2 may be disposed in the groove GR adjacent to the second over-tag area OTA2.

In an embodiment, the mother substrate 10 for the color conversion substrate may further include a light source disposed under the substrate SUB. The light source may be disposed under the display area DA of the substrate SUB. Also, the light source may be disposed under the tag area TA of the substrate SUB. However, in other embodiment, the light source may not be disposed under the substrate SUB.

In an embodiment, since the mother substrate 10 for the color conversion substrate includes the tag area TA, a cause of a defect occurring in the color conversion layer CCL included in the display area DA of the color conversion substrate may be identified. That is, when a defect occurs when the color conversion layer CCL included in the display area DA of the color conversion substrate is formed, the cause of the defect occurring in the color conversion layer CCL of the display area DA by comparing the first ink layer QDL1 and/or the second ink layer QDL2 of the sub-tag areas STA and the third ink layer QDL3 and/or the fourth ink layer QDL4 of the over-tag areas OTA of the tag area TA with the color conversion layer CCL of the display area DA. In addition, since it is possible to test whether the color conversion substrate is defective in advance, the defect improvement rate may increase by about 5 percentages (%) or more and less than about 100%.

Figure 8:
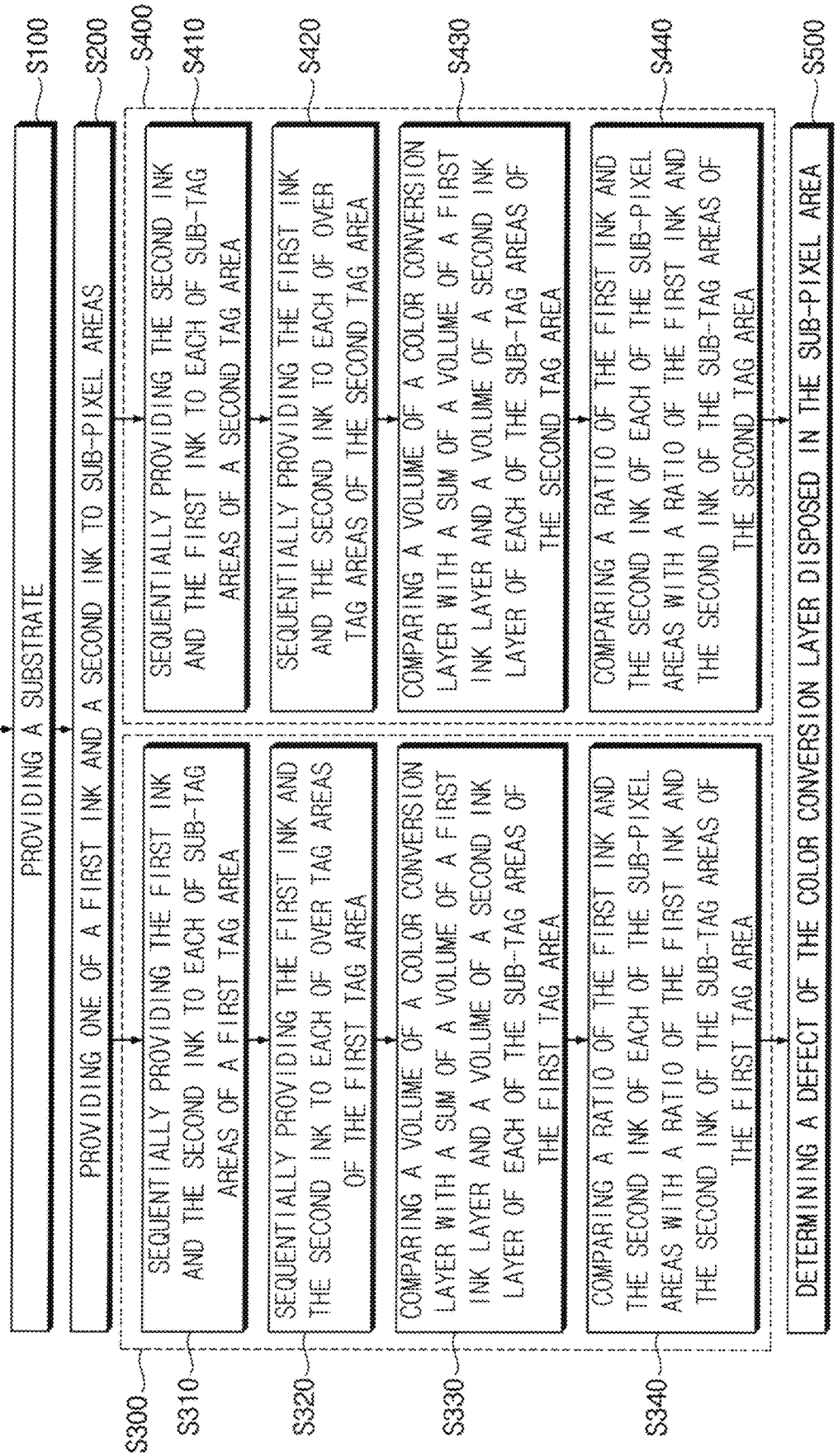
FIG. 8 is a flowchart illustrating a method of testing a color conversion substrate according to an embodiment of the present invention.
Figure 12:
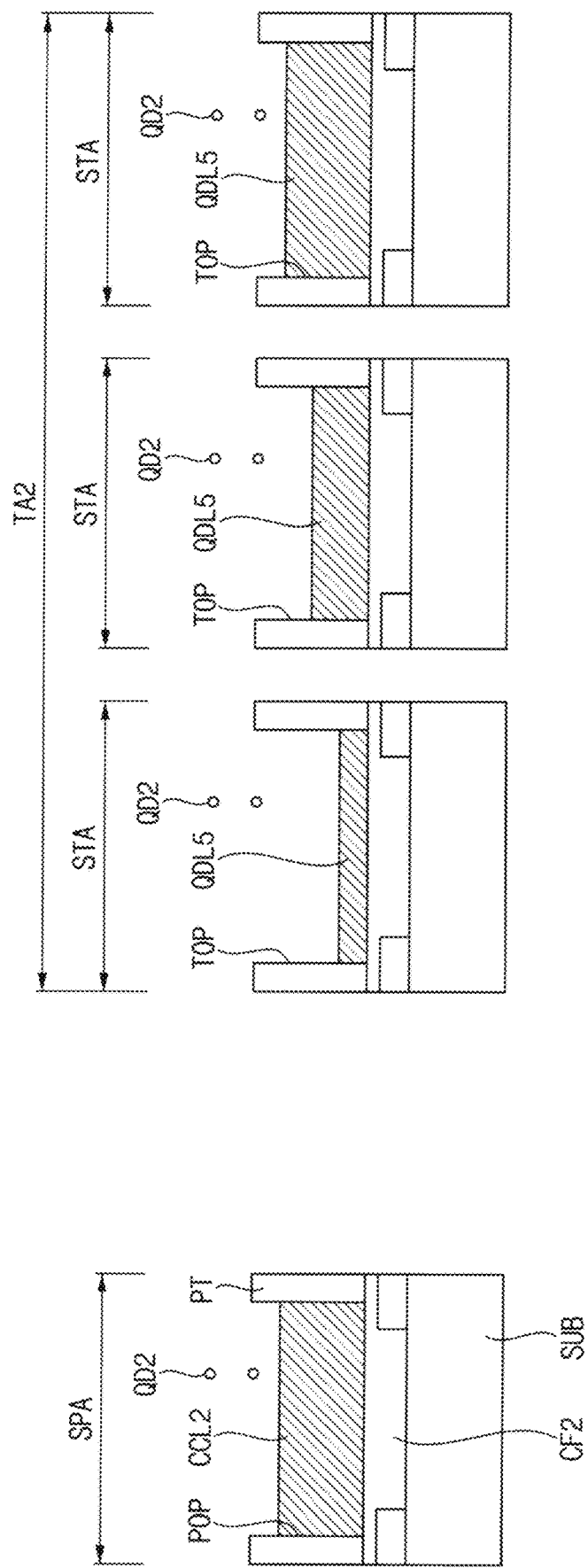
Figure 13:
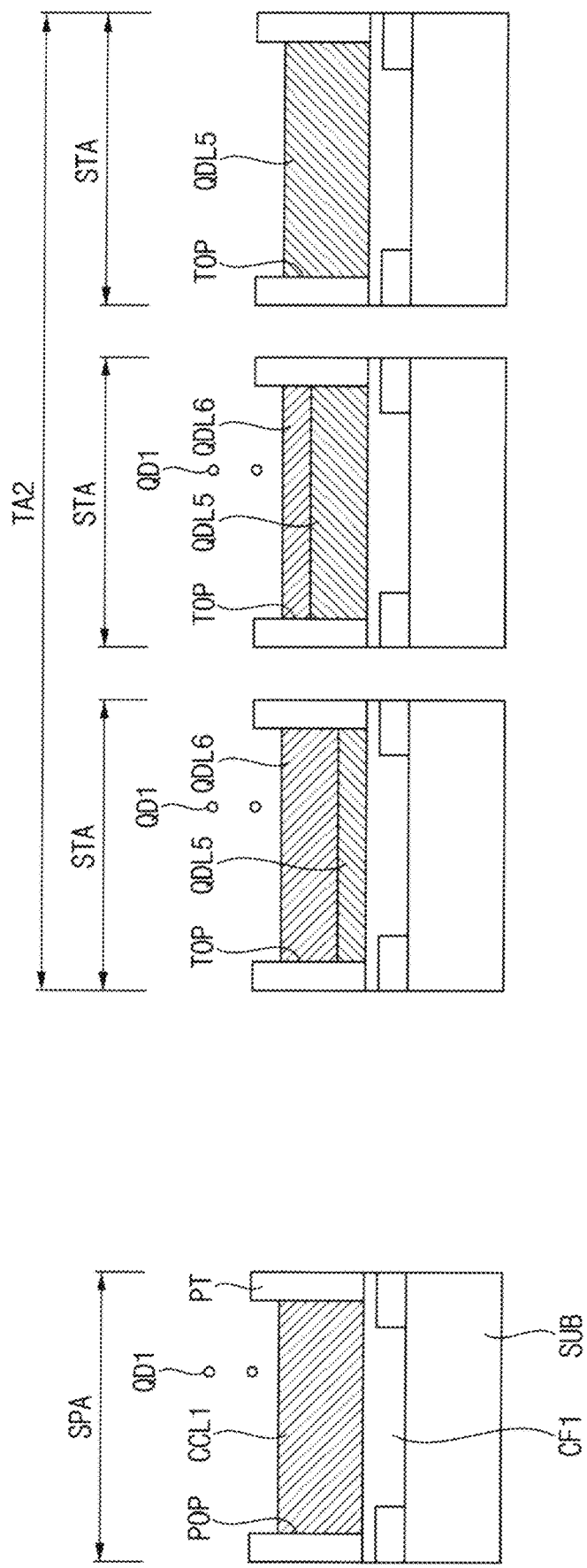
Figure 14:
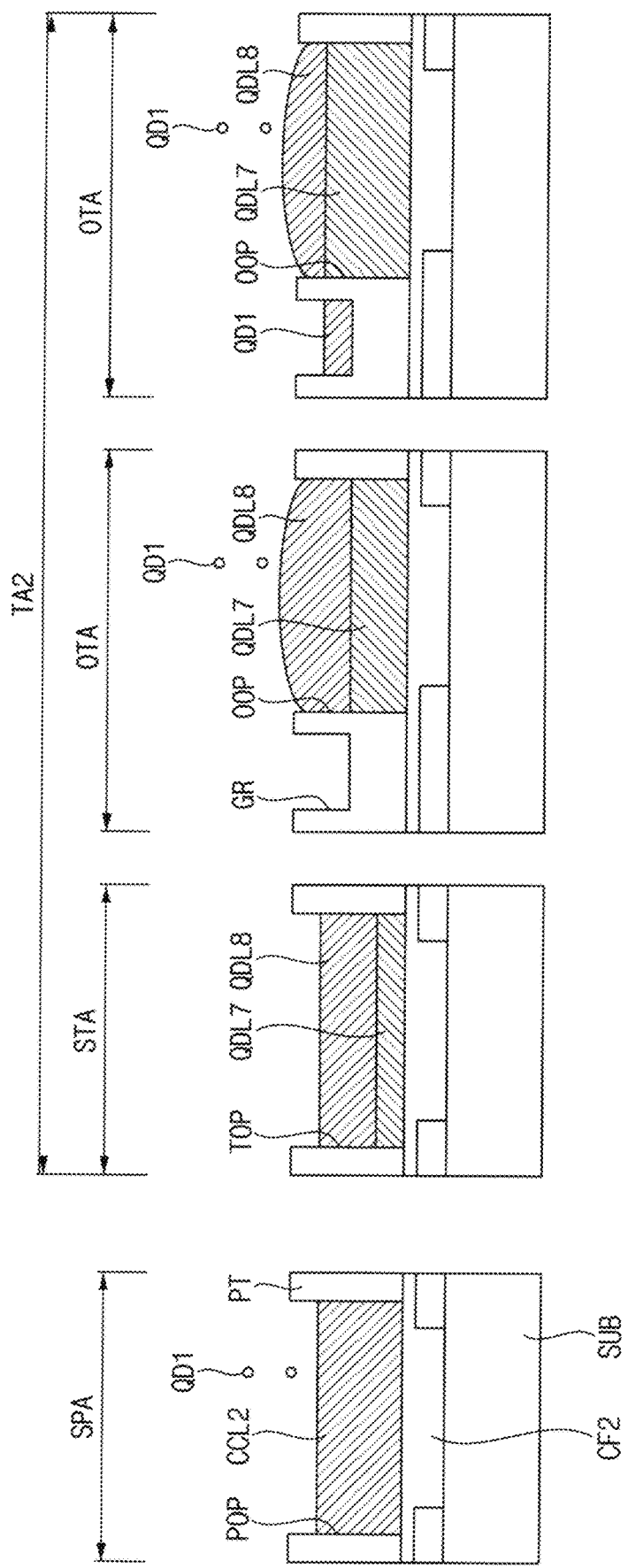

FIG. 8 is a flowchart illustrating a method of testing a color conversion substrate according to an embodiment of the present invention. FIGS. 9 to 14 are cross-sectional views for explaining a method of testing a color conversion substrate according to an embodiment of the present invention. For example, FIGS. 9 to 11 may be drawings comparing the sub-pixel area SPA of the pixel area and the sub-tag areas STA of the first tag area TA1 with each other, and FIGS. 12 to 14 are drawings comparing the sub-pixel area SPA of the pixel area and the sub-tag areas STA of the second tag area TA2 with each other.

Also, each of the sub-tag areas STA and the over-tag areas OTA of FIGS. 9 to 14 may be different from each other. For example, the sub-tag areas STA of FIG. 9 may be three sub-tag areas arbitrarily selected from among the sub-tag areas STA1, STA2, STA3, STA4, STA5, STA6, STAT, STAB, STA9, and STA10 of FIG. 4 (e.g., the second sub-tag area STA2, the third sub-tag area STA3, and the fourth sub-tag area STA4 of FIG. 4).

A method of testing the color conversion substrate described with reference to FIGS. 8 to 14 may represent a method of testing using the mother substrate 10 for the color conversion substrate described with reference to FIGS. 1 to 7.

Referring to FIG. 8, a substrate SUB, a partition PT, a black matrix BM, and a color filter layer CF may be prepared (S100). The substrate SUB, the partition PT, the black matrix BM, and the color filter layer CF may be substantially equal to those of the mother substrate 10 for the color conversion substrate of FIG. 1.

Referring to FIGS. 1, 2, 3, and 8, the substrate SUB may include a display area DA and a first tag area TA1 and a second tag area TA2 disposed around the display area DA. Each of the first tag area TA1 and the second tag area TA2 may be adjacent to the display area DA. The first tag area TA1 and the second tag area TA2 may be spaced apart from each other in a plan view.

The display area DA may include the pixel areas PA, and each of the pixel areas PA may include the sub-pixel areas SPA. Each of the first tag area TA1 and the second tag area TA2 may include sub-tag areas STA. Each of the first tag area TA1 and the second tag area TA2 may further include over-tag areas OTA.

In the partition PT, a pixel opening POP overlapping each of the sub-pixel areas SPA, at least one tag opening TOP overlapping each of the sub-tag areas STA, and at least one over-tag opening OOP overlapping each of the over-tag areas OTA may be defined. Also, grooves GR disposed around the over-tag openings OOP may be defined in the partition PT. The pixel opening POP, the tag opening TOP, and the over-tag opening OOP may have substantially the same volume. However, in the following description, a case in which one tag opening TOP is disposed in one sub-tag area STA and a case in which one over-tag opening OOP is disposed in one over-tag area OTA will be described First, one of the first ink QD1, the second ink QD2, and the third ink may be provided to each of the sub-pixel areas SPA (S200). For example, the first ink QD1 may be provided to the first sub-pixel area SPA1 of FIG. 2, and the second ink QD2 may be provided to the second sub-pixel area SPA2 of FIG. 2, and the third ink may be provided to the third sub-pixel area SPA3 of FIG. 2. Accordingly, the color conversion layers CCL disposed in the sub-pixel areas SPA, respectively, may be formed, and each of the color conversion layers CCL may fill the pixel opening POP. A step of providing one of the first ink QD1, the second ink QD2, and the third ink to each of the sub-pixel areas SPA may be performed by an inkjet process.

Hereinafter, a step of forming optionally the first ink layer QDL1 and optionally the second ink layer QDL2 in each of the sub-tag areas STA of the first tag area TA1, and forming optionally the third ink layer QDL3 and optionally the fourth ink layer QDL4 in each of the over-tag areas OTA of the first tag area TA1, and comparing the sub-tag areas STA of the first tag area TA1 and the pixel area PA (S300) may be introduced.

Optionally the first ink QD1 and optionally the second ink QD2 may be provided to each of the sub-tag areas STA of the first tag area TA1 (S310). The first ink QD1 disposed in each of the sub-tag areas STA of the first tag area TA1 may form the first ink layer QDL1, and the second ink QD2 disposed on each of the sub-tag areas STA of the first tag area TA1 may form the second ink layer QDL2. Accordingly, the first ink layer QDL1 and/or the second ink layer QDL2 may fill the tag opening TOP.

Also, the first ink QD1 and the second ink QD2 may be provided to each of the over-tag areas OTA of the first tag area TA1 (S320). The first ink QD1 disposed in each of the over-tag areas OTA of the first tag area TA1 may form the third ink layer QDL3, and the second ink QD2 disposed on each of the over-tag areas OTA of the first tag area TA1 may form the fourth ink layer QDL4. Accordingly, the third ink layer QDL3 and/or the fourth ink layer QDL4 may fill the over-tag opening OOP.

Figure 9:
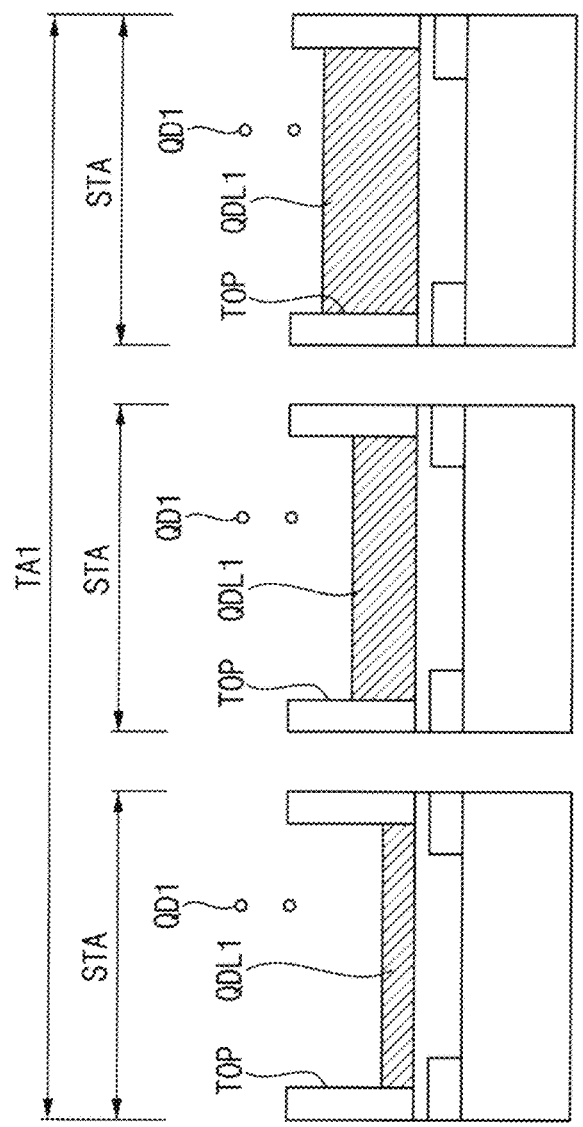
FIGS. 9 to 14 are cross-sectional views for explaining a method of testing a color conversion substrate according to an embodiment of the present invention.
Figure 9:
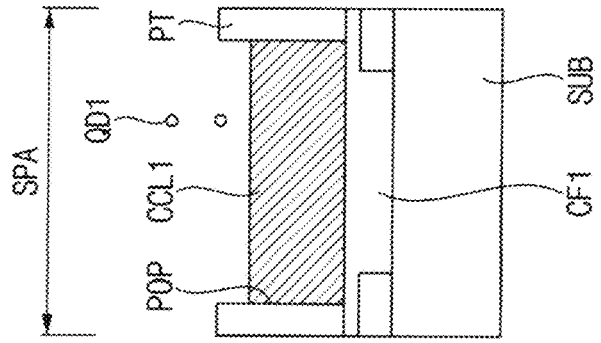
Figure 10:
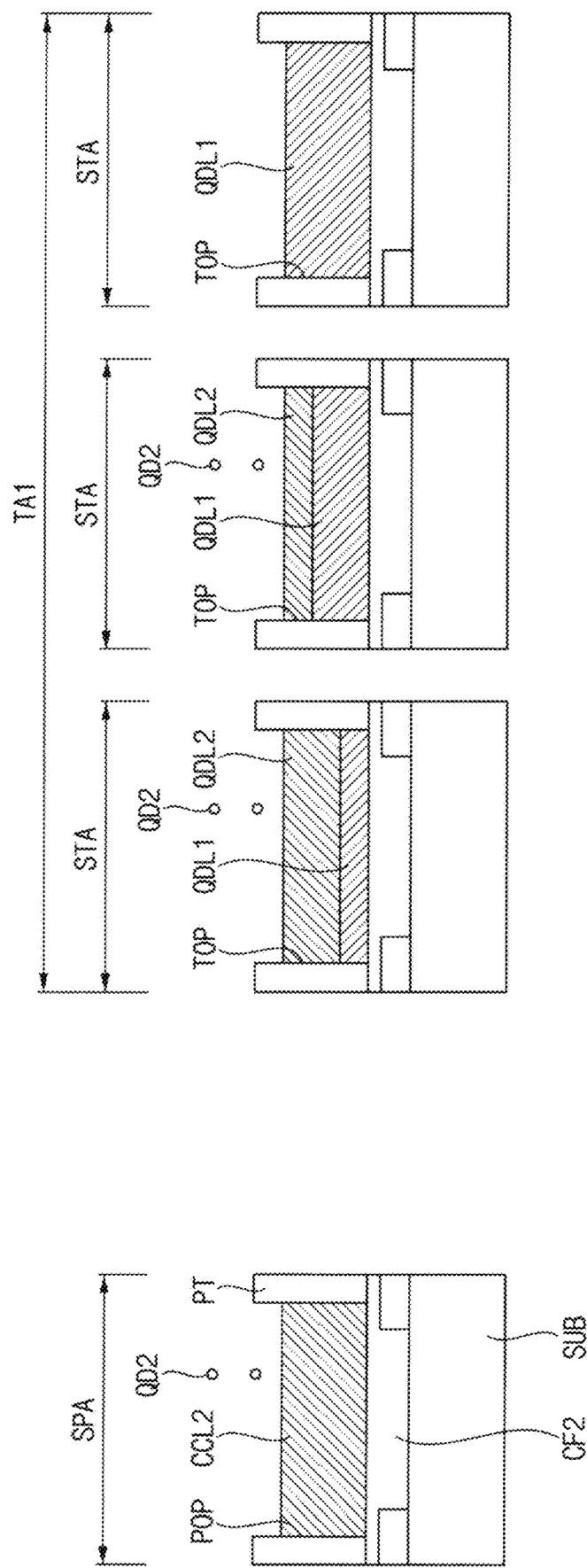

Referring further to FIGS. 9 and 10, in an embodiment, in the first tag area TA1, the first ink QD1 may be first provided to each of the sub-tag areas STA. Then, the second ink QD2 may be provided to each of the sub-tag areas STA. That is, the first ink QD1 and the second ink QD2 may be sequentially provided to each of the sub-tag areas STA of the first tag area TA1. Accordingly, the first ink layer QDL1 may be formed under the second ink layer QDL2 in the tag openings TOP of the first tag area TA1.

The sum of the volume of the first ink layer QDL1 and the volume of the second ink layer QDL2 of each of the sub-tag areas STA of the first tag area TA1 may be less than or equal to the volume of the color conversion layer CCL. Accordingly, the first ink QD1 and/or the second ink QD2 may be provided to each of the sub-tag areas STA of the first tag area TA1 not to exceed the volume of the color conversion layer CCL.

Figure 11:
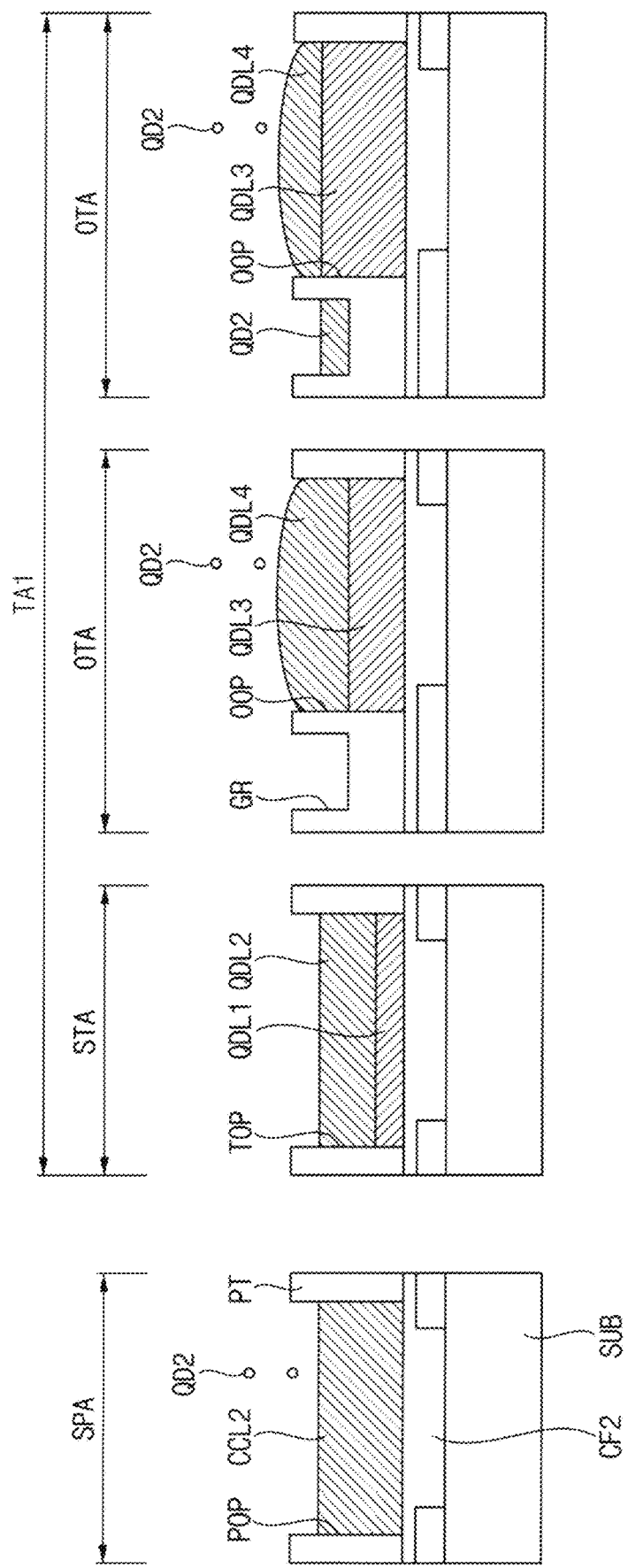

Referring further to FIG. 11, similarly, in the first tag area TA1, the first ink QD1 may be first provided to each of the over-tag areas OTA. Then, the second ink QD2 may be provided to each of the over-tag areas OTA. That is, the first ink QD1 and the second ink QD2 may be sequentially provided to each of the over-tag areas OTA of the first tag area TA1. Accordingly, the third ink layer QDL3 may be formed under the fourth ink layer QDL4 in the over-tag openings OOP of the first tag area TA1.

The sum of the volume of the third ink layer QDL3 and the volume of the fourth ink layer QDL4 of each of the over-tag areas OTA of the first tag area TA1 may be greater than the volume of the color conversion layer CCL. Accordingly, the first ink QD1 and/or the second ink QD2 may be provided to each of the over-tag areas OTA of the first tag area TA1 to exceed the volume of the color conversion layer CCL.

Accordingly, the second ink QD2 provided in the over-tag opening OOP overlapping each of the over-tag areas OTA may overflow. The overflowed second ink QD2 may be disposed in the grooves GR around the over-tag opening OOP.

In an embodiment, a step of providing the first ink QD1 and the second ink QD2 to each of the sub-pixel areas SPA (S200), and a step of providing the first ink QD1 and the second ink QD2 to each of the sub-tag areas STA of the first tag area TA1 (S310), and a step of providing the first ink QD1 and the second ink QD2 to the over-tag areas OTA of the first tag area TA1 (S320) may be performed simultaneously.

Hereinafter, a step of forming a fifth ink layer QDL5 and a sixth ink layer QDL6 in each of the sub-tag areas STA of the second tag area TA2, and forming a seventh ink layer QDL7 and a eighth ink layer QDL8 in each of the over-tag areas OTA of the second tag area TA2, and comparing the sub-tag areas STA of the second tag area TA2 and the pixel area PA (S400) may be introduced.

Optionally the second ink QD2 and optionally the first ink QD1 may be provided to each of the sub-tag areas STA of the second tag area TA2 (S410). The second ink QD2 disposed in each of the sub-tag areas STA of the second tag area TA2 may form the fifth ink layer QDL5 and the first ink QD1 disposed in each of the sub-tag areas STA of the second tag area TA2 may form the sixth ink layer QDL6. Accordingly, the fifth ink layer QDL5 and/or the sixth ink layer QDL6 may fill the tag opening TOP.

Also, the second ink QD2 and the first ink QD1 may be provided to each of the over-tag areas OTA of the second tag area TA2 (S420). The second ink QD2 disposed in each of the over-tag areas OTA of the second tag area TA2 may form the seventh ink layer QDL7, and the first ink QD1 disposed in each of the over-tag areas OTA of the second tag area TA2 may form the eighth ink layer QDL8. Accordingly, the seventh ink layer QDL7 and/or the eighth ink layer QDL8 may fill the over-tag opening OOP.

Referring to FIGS. 12 and 13, in an embodiment, in the second tag area TA2, the second ink QD2 may be first provided to each of the sub-tag areas STA. Then, the first ink QD1 may be provided to each of the sub-tag areas STA. That is, the second ink QD2 and the first ink QD1 may be sequentially provided to each of the sub-tag areas STA of the second tag area TA2. Accordingly, the fifth ink layer QDL5 may be formed under the sixth ink layer QDL6 in the tag openings TOP of the second tag area TA2.

A sum of the volume of the fifth ink layer QDL5 and the volume of the sixth ink layer QDL6 of each of the sub-tag areas STA of the second tag area TA2 may be less than or equal to the volume of the color conversion layer CCL. Accordingly, the second ink QD2 and/or the first ink QD1 may be provided to each of the sub-tag areas STA of the second tag area TA2 not to exceed the volume of the color conversion layer CCL.

Referring further to FIG. 14, similarly, in the second tag area TA2, the second ink QD2 may be first provided to each of the over-tag areas OTA. Then, the first ink QD1 may be provided to each of the over-tag areas OTA. That is, the second ink QD2 and the first ink QD1 may be sequentially provided to each of the over-tag areas OTA of the second tag area TA2. Accordingly, the seventh ink layer QDL7 may be formed under the eighth ink layer QDL8 in the over-tag openings OOP of the second tag area TA2.

The sum of the volume of the seventh ink layer QDL7 and the volume of the eighth ink layer QDL8 of each of the over-tag areas OTA of the second tag area TA2 may be greater than or equal to the volume of the color conversion layer CCL. Accordingly, the second ink QD2 and/or the first ink QD1 may be provided to each of the over-tag areas OTA of the second tag area TA2 to exceed the volume of the color conversion layer CCL.

Accordingly, the first ink QD1 provided in the over-tag opening OOP overlapping each of the over-tag areas OTA may overflow. The overflowed first ink QD1 may be disposed in the grooves GR around the over-tag opening OOP.

In an embodiment, a step of providing the second ink QD2 and the first ink QD1 to each of the sub-tag areas STA of the second tag area TA2 (S410) and a step of providing the second ink QD2 and the first ink QD1 to each of the over-tag areas OTA of the second tag area TA2 may be simultaneously performed.

Next, in an embodiment, the volume of the color conversion layer CCL of each of the sub-pixel areas SPA and the sum of the volume of the first ink layer QDL1 and the volume of the second ink layer QDL2 of each of the sub-tag areas STA of the first tag area TA1 may be compared with each other (S330).

In this case, a first value of each of the sub-pixel areas SPA and a first value of each of the sub-tag areas STA of the first tag area TA1 may be compared with each other. The first value may be one of a light absorption amount, an external quantum efficiency, a peak wavelength, and a full width of half maximum (FWHM).

For example, the light absorption amount of each of the sub-pixel areas SPA and the light absorption amount of each of the sub-tag areas STA of the first tag area TA1 may be compared with each other. The light absorption amount may increase as the volume of the color conversion layer CCL disposed in the sub-pixel area PA increases. As the volume of the color conversion layer CCL increases, an amount of the first ink QD1 and/or the second ink QD2 disposed in the color conversion layer CCL may increase, and an amount of the first quantum dots and/or the second quantum dots may increase.

The external quantum efficiency of each of the sub-pixel areas SPA and the external quantum efficiency of each of the sub-tag areas STA of the first tag area TA1 may be compared with each other. The external quantum efficiency may increase as the volume of the color conversion layer CCL increases, and may decrease when the volume exceeds a certain volume.

The peak wavelength of each of the sub-pixel areas SPA and the peak wavelength of each of the sub-tag areas STA of the first tag area TA1 may be compared with each other. The peak wavelength may increase as the volume of the color conversion layer CCL increases.

The full width of half maximum of each of the sub-pixel areas SPA and the full width of half maximum of each of the sub-tag areas STA of the first tag area TA1 may be compared with each other. The full width at half maximum may decrease as the volume of the color conversion layer CCL increases.

Accordingly, by comparing the first value of each of the sub-pixel areas SPA with the first value of each of the sub-tag areas STA of the first tag area TA1 with each other, it is possible to determine a degree how much the color conversion layer CCL is filled by ink.

In an embodiment, the volume of the color conversion layer CCL of each of the sub-pixel areas SPA and the sum of the volume of the third ink layer QDL3 and the volume of the fourth ink layer QDL4 of each of the over-tag areas OTA of the first tag area TA1 may be compared with each other.

In this case, the first value of each of the sub-pixel areas SPA and the first value of each of the over-tag areas OTA of the first tag area TA1 may be compared with each other. The first value may be one of a light absorption amount, an external quantum efficiency, a peak wavelength, and a full width of half maximum (FWHM). However, embodiments according to the present invention are not limited thereto, and in other embodiments, the first value may include a top view and a cross-sectional view of each of the pixel opening POP, the tag opening TOP, and the over-tag opening OOP.

Accordingly, by comparing the first value of each of the sub-pixel areas SPA with the first value of each of the over-tag areas OTA of the first tag area TA1, it is possible to determine a degree how much the color conversion layer CCL is filled by ink.

In an embodiment, by comparing the volume of the color conversion layer CCL of each of the sub-pixel areas SPA and the sum of the volume of the third ink layer QDL3 and the volume of the fourth ink layer QDL4 of each of the over-tag areas OTA of the first tag area TA1 with each other, it is possible to determine the volume of the color conversion layer CCL is greater than the volume of the pixel opening POP.

In an embodiment, the volume ratio of the first ink QD1 and the second ink QD2 included in the color conversion layer CCL of each of the sub-pixel areas SPA and the volume ratio of the first ink layer QDL1 and the second ink layer QDL2 of each of the sub-tag areas STA of the first tag area TA1 may be compared with each other (S340).

In this case, a second value of each of the sub-pixel areas SPA and a second value of each of the sub-tag areas STA of the first tag area TA1 may be compared with each other.

The second value may be one of an external quantum efficiency and a peak wavelength.

The external quantum efficiency of each of the sub-pixel areas SPA and the external quantum efficiency of each of the sub-tag areas STA of the first tag area TA1 may be compared with each other. The external quantum efficiency may vary according to a volume ratio of the first ink QD1 and the second ink QD2.

The peak wavelength of each of the sub-pixel areas SPA and the peak wavelength of each of the sub-tag areas STA of the first tag area TA1 may be compared with each other. The peak wavelength may vary according to the volume ratio of the first ink QD1 and the second ink QD2.

Accordingly, as the second value of each of the sub-pixel areas SPA and the second value of each of the sub-tag areas STA of the first tag area TA1 are compared with each other it is possible to determine the volume ratio of the first ink QD1 and the second ink QD2 disposed in each of the sub-pixel areas SPA.

Similarly, in an embodiment, the volume of the color conversion layer CCL of each of the sub-pixel areas SPA and the sum of the volume of the second ink layer QDL2 and the volume of the first ink layer QDL1 of each of the sub-tag areas STA of the second tag area TA2 may be compared with each other (S430).

In this case, the first value of each of the sub-pixel areas SPA and the first value of each of the sub-tag areas STA of the second tag area TA2 may be compared with each other. The first value may be one of a light absorption amount, an external quantum efficiency, a peak wavelength, and a full width of half maximum (FWHM).

In an embodiment, the ratio of the first ink QD1 and the second ink QD2 of each of the sub-pixel areas SPA and the ratio of the first ink QD1 and the second ink QD2 of each of the sub-tag areas STA of the second tag area TA2 may be compared with each other (S440). The ratio of the first ink QD1 and the second ink QD2 may be the ratio of the volume occupied by each of the first ink QD1 and the second ink QD2 of each of the sub-pixel areas SPA, and may be the ratio of the volume occupied by each of the first ink QD1 and the second ink QD2 of each of the sub-tag areas STA of the second tag area TA2.

In this case, the second value of each of the sub-pixel areas SPA and the second value of each of the sub-tag areas STA of the second tag area TA2 may be compared with each other. The second value may be one of the external quantum efficiency and the peak wavelength.

The light absorption amount, the external quantum efficiency, the peak wavelength, and the full width of half maximum of the color conversion layer CCL may vary according to an arrangement order of the first ink QD1 and the second ink QD2 disposed in the color conversion layer CCL. Accordingly, the order of providing the first ink QD1 and the second ink QD2 to each of the sub-tag areas STA disposed in each of the first tag area TA1 and the second tag area TA2 may be different from each other.

In an embodiment, as the sub-pixel areas SPA and the sub-tag areas STA of the first tag area TA1 are compared, respectively, and the sub-pixel areas SPA and the sub-tag areas STA of the second tag area TA2 are compared, respectively, it is possible to determine a defect of the color conversion layer CCL of each of the sub-pixel areas SPA (S500).

In an embodiment, it may be determined whether a defect in the color conversion layer CCL that may occur when an inkjet process for manufacturing the color conversion substrate is performed using the mother substrate 10 for the color conversion substrate. That is, the defect of the color conversion layer CCL may be a case in which inks having different colors are disposed together in one color conversion layer CCL or inks having a volume larger than the volume of the color conversion layer CCL are disposed. Due to the method of testing the color conversion substrate according to the invention, the defect improvement rate of the color conversion substrate may be increased by about 5% or more and about 100% or less.

In addition, an luminous efficiency of the display device including the color conversion substrate may be tested in advance by using the mother substrate 10 for the color conversion substrate. Accordingly, it is possible to increase the luminous efficiency of the display device.

The mother substrate and the method according to the embodiments may be applied to a display device included in a computer, a notebook, a mobile phone, a smartphone, a smart pad, a PMP, a PDA, an MP3 player, or the like.

Although the mother substrate and the method according to the embodiments have been described with reference to the drawings, the illustrated embodiments are examples, and may be modified and changed by a person having ordinary knowledge in the relevant technical field without departing from the technical spirit described in the following claims.

What is claimed is:

1. A mother substrate for a color conversion substrate, the mother substrate comprising:
   a substrate including a display area and a tag area, wherein the tag area is disposed around the display area and includes a plurality of sub-tag areas;
   a first ink layer disposed in some of the sub-tag areas and having a first color; and
   a second ink layer disposed in some of the sub-tag areas and having a second color different from the first color,
   wherein a volume of the first ink layer in each of the some of the sub-tag areas is different from each other, or
   a volume of the second ink layer in each of the some of the sub-tag areas is different from each other.

2. The mother substrate of claim 1, wherein the sub-tag areas include a first sub-tag area and a second sub-tag area,
   a sum of the volume of the first ink layer in the first sub-tag area and the volume of the second ink layer in the first sub-tag area is equal to a sum of the volume of the first ink layer in the second sub-tag area and the volume of the second ink layer in the second sub-tag area, and
   a ratio of the volume of the first ink layer in the first sub-tag area and the volume of the second ink layer in the first sub-tag area is different from a ratio of the volume of the first ink layer in the second sub-tag area and the volume of the second ink layer in the second sub-tag area.

3. The mother substrate of claim 2, wherein the sub-tag areas further include a third sub-tag area in which at least one of the first ink layer and the second ink layer is disposed,
   the ratio of the volume of the first ink layer in the first sub-tag area and the volume of the second ink layer in the first sub-tag area is equal to a ratio of a volume of the first ink layer on the third sub-tag area and a volume of the second ink layer in the third sub-tag area, and
   the sum of the volume of the first ink layer in the first sub-tag area and the volume of the second ink layer in the first sub-tag area is different from a sum of the volume of the first ink layer in the third sub-tag area and the volume of the second ink layer in the third sub-tag area.

4. The mother substrate of claim 2, wherein the sub-tag areas further include a fourth sub-tag area in which at least one of the first ink layer and the second ink layer is disposed, the ratio of the volume of the first ink layer in the first sub-tag area and the volume of the second ink layer in the first sub-tag area is different from a ratio of a volume of the first ink layer in the fourth sub-tag area and a volume of the second ink layer in the fourth sub-tag area, and
   the sum of the volume of the first ink layer in the first sub-tag area and the volume of the second ink layer in the first sub-tag area is different from a sum of the volume of the first ink layer in the fourth sub-tag area and the volume of the second ink layer in the fourth sub-tag area.

5. The mother substrate of claim 1, further comprising:
   a partition defining at least one tag opening overlapping with each of the sub-tag areas.

6. The mother substrate of claim 5, wherein the display area includes a sub-pixel area,
   the partition defines a pixel opening overlapping with the sub-pixel area, and
   a volume of the pixel opening is equal to a volume of the tag opening.

7. The mother substrate of claim 6, further comprising:
   a color conversion layer disposed in the sub-pixel area.

8. The mother substrate of claim 7, wherein the first ink layer and the second ink layer are disposed in the tag opening, and
   a sum of a volume of the first ink layer in the tag opening and a volume of the second ink layer in the tag opening is equal to or less than a volume of the color conversion layer.

9. The mother substrate of claim 7, wherein the tag area further includes a plurality of over-tag areas spaced apart from the sub-tag areas, and
   the mother substrate further comprises:
   a third ink layer disposed in each of the over-tag areas and having the first color; and
   a fourth ink layer disposed in each of the over-tag areas and having the second color.

10. The mother substrate of claim 9, wherein the partition defines at least one over-tag opening overlapping with each of the over-tag areas, and
    a volume of the over-tag opening is equal to a volume of the tag opening.

11. The mother substrate of claim 10, wherein the tag area defines a plurality of grooves disposed around each of the over-tag areas.

12. The mother substrate of claim 10, wherein the third ink layer and the fourth ink layer are disposed in the over-tag opening, and
    a sum of a volume of the third ink layer in the over-tag opening and a volume of the fourth ink layer in the over-tag opening is equal to or greater than a volume of the color conversion layer.

* * * * *